United States Patent [19]

Nagata et al.

[11] Patent Number: 4,495,871
[45] Date of Patent: Jan. 29, 1985

[54] TABLE SLIDING APPARATUS

[75] Inventors: Keiji Nagata, Hirakata City; Syuji Ueda, Neyagawa City; Yoshiyuki Tanigawa, Hirakata City, all of Japan

[73] Assignee: Matsushita Electric Industrial Co., Ltd., Japan

[21] Appl. No.: 403,150

[22] Filed: Jul. 29, 1982

[30] Foreign Application Priority Data

Aug. 11, 1981 [JP] Japan ................................. 56-125659

[51] Int. Cl.³ .............................................. A47B 85/00
[52] U.S. Cl. ....................................... 108/20; 108/143
[58] Field of Search .................................. 108/20, 143; 308/DIG. 1, DIG. 7, 3 A, 6 R

[56] References Cited

U.S. PATENT DOCUMENTS

| | | | |
|---|---|---|---|
| 3,032,377 | 5/1962 | Blase | 308/DIG. 7 |
| 3,037,893 | 6/1962 | White | 308/DIG. 7 |
| 4,242,968 | 1/1981 | Schaidl et al. | 108/20 |
| 4,378,134 | 3/1983 | Eddy | 308/3 A |

FOREIGN PATENT DOCUMENTS 35269 10/1976 Japan .

OTHER PUBLICATIONS

IBM Technical Disclosure Bulletin; vol. 14, No. 11, Apr. 1972.

*Primary Examiner*—James T. McCall
*Attorney, Agent, or Firm*—Eric P. Schellin

[57] ABSTRACT

In a sliding table 40 slidingly mounted on a guide block 6 with an air bearing therebetween, a moving bracket 38, which is driven by a rotation of a driving screw rod 35 in an axial direction of the latter, is coupled with an elastic coupling means. The elastic coupling means is formed by abutting the moving bracket 38 to the faces of the holding blocks 41 and 42 of the sliding table 40, with a rubber sheet 43 and 44 or the like springy means inbetween.

3 Claims, 6 Drawing Figures

TABLE SLIDING APPARATUS

BACKGROUND OF THE INVENTION

1. Field of the Invention

The present invention relates to a table sliding apparatus for slidingly drives a table carrying a work thereon for machining such as cutting or dicing a piece of metal, semiconductor into small strips or the like.

2. Description of the Prior Art

Conventional table sliding apparatus for slidingly drives a table carrying a work for machining is illustrated referring to FIG. 1, FIG. 2 and FIG. 3, which show an exemplary conventional apparatus for dicing by means of a diamond disk blade.

FIG. 1 illustrates fundamental principle of dicing or cutting a work by using a diamond disk blade 3, wherein the work 2, such as metal piece or semiconductor piece 2 is fixed on a sliding table 1 by a suitable bond, for example a wax inbetween. Then while the table 1 is put at a resting position at the left above as shown by chain lines in the FIGURE, the height of axis and position on the table of the disk blade 2 is adjusted so as to form a desired depth of the diced groove 4 at a desired position on the work piece 2. Then, the diamond disk blade 3 is rotated by a motor 5, and the table 1 is slid to the right lower side of the FIGURE, so that the work 2 is diced and groove 4 is formed to have a desired depth. When it is intended to cut the work 2 into strips, the height of axis of the disk blade 3 is adjusted in a manner that the groove 4 reaches or slightly exceeds the bottom of the work 2. In such case, usually a sheet of a relatively soft material, such as stucco or the like is inserted between the work 2 and the table 1. The sliding of the table 1 of the conventional apparatus is made by means of screw driving means illustrated in FIG. 2. The table 1 is formed in an inverted U shape and slidingly mounted on a guide block 6 by a suitable means. A driving screw rod 13 is rotatably held by a pair of bearings 7 and 8 fixed to brackets 16 and 17 which are integral to the guide block 6. The screw rod 13 is screw-engaging with a female screw threaded driven hole formed on or a nut 9 fixed on a moving bracket 15. The moving bracket 15 is fixed integral to the table 1. One end of the screw driving rod 13 is connected through a flexible joint 18 to an output shaft of a motor 20. When the motor is driven at a constant predetermined speed, the driving screw rod 13 rotates and drives the moving bracket 15. Therefore, the table 1 slides in the direction of the arrow "a" and makes the rotating disk blade 3 cut or dice the work 2.

Problem in such conventional construction is that, when the axis of the driving screw rod 13 is not straight, the driven screw hole 9 is vibrated radially of it, and therefore the table 1 receives pitching and yawing motions. Therefore, the work receives fluctuations of depth of the grooves 4 by the pitching motion and fluctuations of pitch between the grooves 4 by the yawing. Thus the accuracy of sizes of the works is spoiled by even a small deflection of the linearity of the driving screw rod. Furthermore, such pitchings and yawings of the table 1 causes the disk blade 3 to make a twisting motion $F_y$ or $F'_y$, which, when larger than a certain limit, will breaks the rotating disk blade 3 and is very dangerous, and thereby the production yield of the works become very poor.

SUMMARY OF THE INVENTION

The present invention purports to provide an improved table slider apparatus, wherein the pitching and yawing of the table due to the non linearity of the driving screw rod is avoided, thereby assuring very accurate working.

DESCRIPTION OF PREFERRED EMBODIMENT

Figure 1:
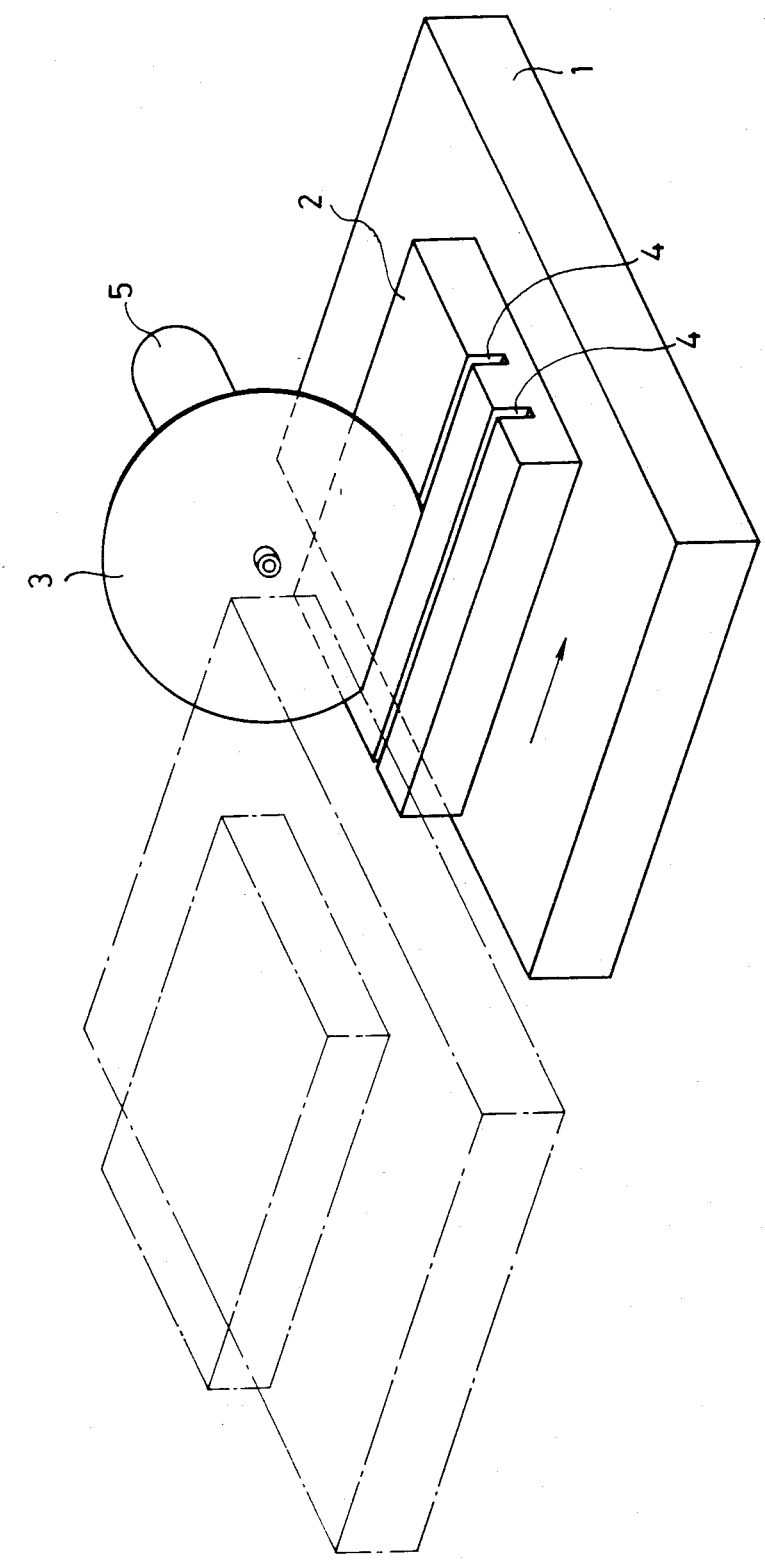
FIG. 1 is the perspective view for illustrating principle of the cutting or dicing the work 2 with the rotating disk blade 3.
Figure 2:
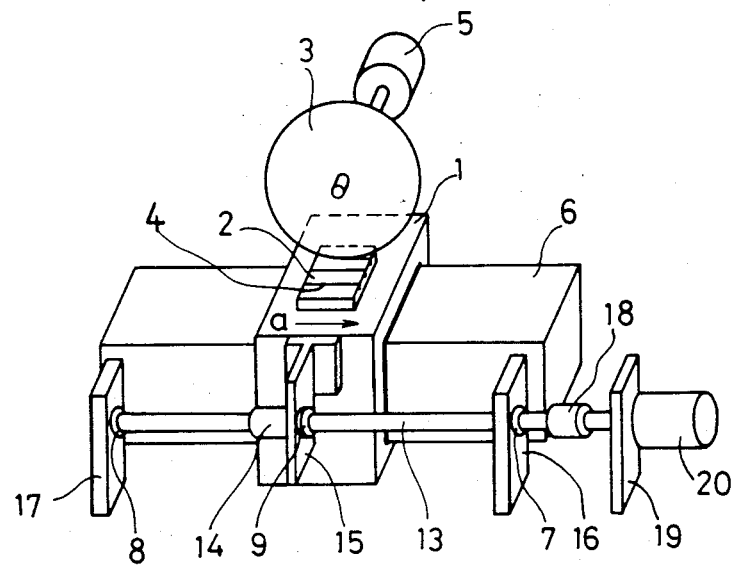
FIG. 2 is a perspective view of the conventional exemplary apparatus of a table slider apparatus for cutting or dicing the work 2 with the rotating disk blade 3.
Figure 3:
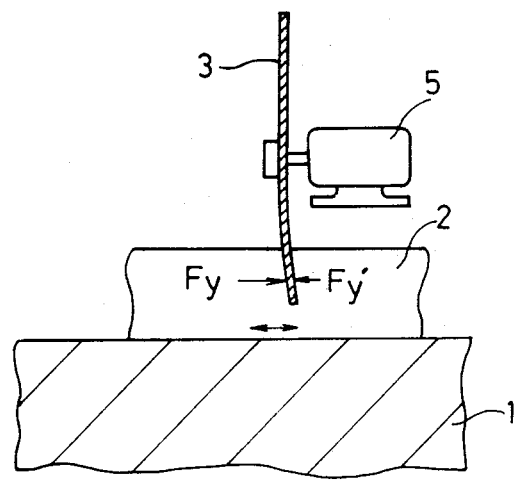
FIG. 3 is a schematic side view of the disk blade 3, the table 1 and the work 2, for illustrating effect of the yawing of the table 1.
Figure 4A:
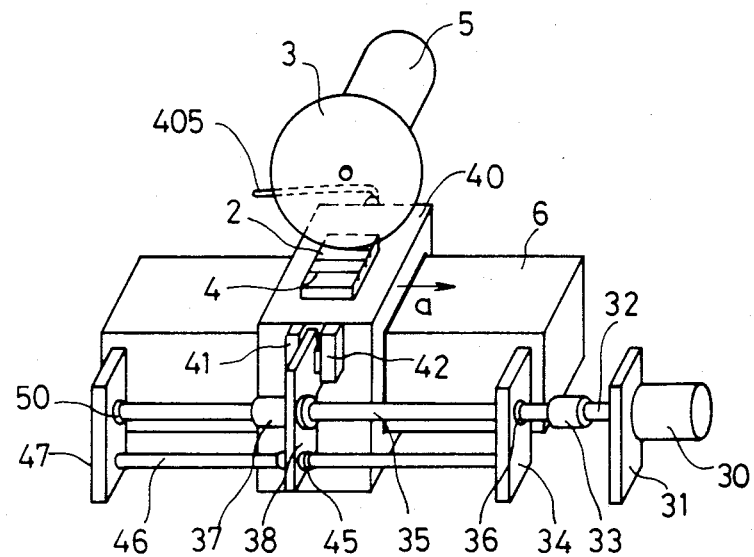
FIG. 4(a) is a perspective view of a table slider apparatus for cutting and dicing with a disk blade in accordance with the present invention.
Figure 4B:
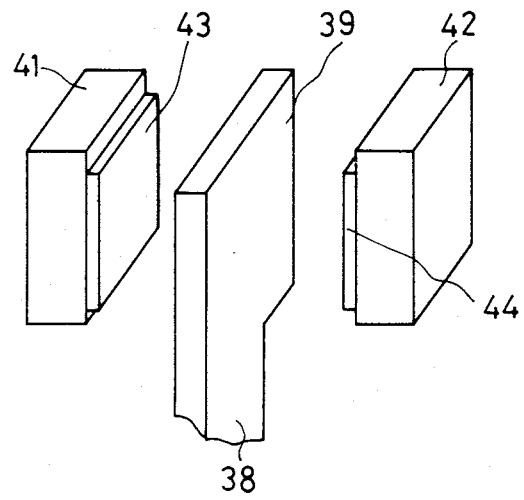
FIG. 4(b) is an enlarged perspective view of an essential part of an engaging part between a moving bracket and receiving means for the moving bracket of the apparatus of FIG. 4.

FIG. 4(a) and FIG. 4(b) show a preferred example of a table slider apparatus embodying the present invention.

A work 2 is fixed on a sliding table 40 which is slidably held along a guide block 6. Preferred way of the sliding bearing is use of air-bearing, which comprises a means to form air films in gaps between the inside faces of the sliding table 40 and the faces of the guide block 6. The air film is formed by feeding a smooth compressed air stream from an air feeding horse 405 to the block of the sliding table 40 and discharge the air streams from air discharging holes disposed facing the air gaps to the faces of the guide block 6. The air from the horse 404 is fed to the discharging holes (which are not shown in FIG. 4, but is disposed in the similar way as those 406–409 shown in FIG. 5. The air is distributed from the horse to the discharging holes by distribution paths 404 formed inside the block of the sliding table 4.

A moving bracket 38 is engaged or coupled with holders 41 and 42 which are integral to the sliding table 40. The feature of the present invention is elastic engagement or coupling between the moving bracket 38 and the sliding table 40. The elastic engagement in this example (of FIG. 4) is attained by providing (bonding) rubber, polyurethane or the like elastic sheets 43 and 44 on the abutting of the holders 41 and 42, respectively, and holding an end part 39 of the moving bracket 38 therebetween. Of course the disposition of the end part 39 is that there is an appropriate space or gaps between its end edge and the front face of the sliding table 40 so that the moving bracket can move a little without colliding the front face between the holders 41 and 42. This elastic engagement or coupling performs absorption of undesirable motions or vibrations of the bracket 38 in the direction of its face by sliding relative to the abutting faces of rubber sheets 43 and 44, but smoothingly transmit the necessary motion to a direction normal to its faces without back rush. The moving bracket 38 has a driven female screw-threaded hole or has a nut 37 fixed thereon. A driving screw rod 35 is screw-engaged with the driven female screw hole of the moving bracket 38, so that when the driving screw rod 35 turns around its axis, the moving bracket 38 moves in the direction of the axis. The driving screw rod 35 is rotatably held at both end parts by a pair of ball-bearings 50 and 36, respectively fixed to bracket 47 and 34, which are integrally fixed to the guide block 6. One end of the driving screw rod 35 is connected by a joint means to a shaft 32 of a motor 30. A guide rod 46 slidingly holds the moving bracket 38 through a linear motion ball bearing 45 fixed thereto, and both ends of the guide rod 46 is fixed to the bracket 47 and 34, so that the moving bracket 38 smoothly slides in the axial direction of the driving screw rod 35 and reduces undesirable pitching or yawing.

For cutting or dicing the work, the position and height of the disk blade 3 is first adjusted, and then the table is slidingly moved by rotating the motor 30 and hence the driving screw rod 35 in the direction of the arrow "a", and then the disk blade 3 cut or dice the work. Then, even when the driving screw rod 35 causes a radial vibration, such vibration is absorbed by the elastic coupling means by the engagement through the rubber sheets 43 and 44, and therefore, neither the pitching nor the yawing of the sliding table 40 does not take place. Further, the guide rod 46 reduces the radial vibration of the moving bracket 38. Therefore, in accordance with the example, the work is not influenced by the pitching and the yawing, and very accurate cutting or dicing is attainable. For example, in dicing precision elements such as sound fork type crystal in resonator elements, by attaining the very high accuracy of dicing, their production yield is greatly improved and the quality is stabilized. By using the construction of the present embodiment, by substantially eliminating the yawing of the disk blade 3 with respect to the work 2, fears of dangerous breaking of the disk blade 3 is eliminated. Furthermore, even if undesirable vibration in axial direction of the moving bracket takes place, this is also absorbed by the rubber-sheet 43 and 44 of the elastic coupling.

Figure 5:
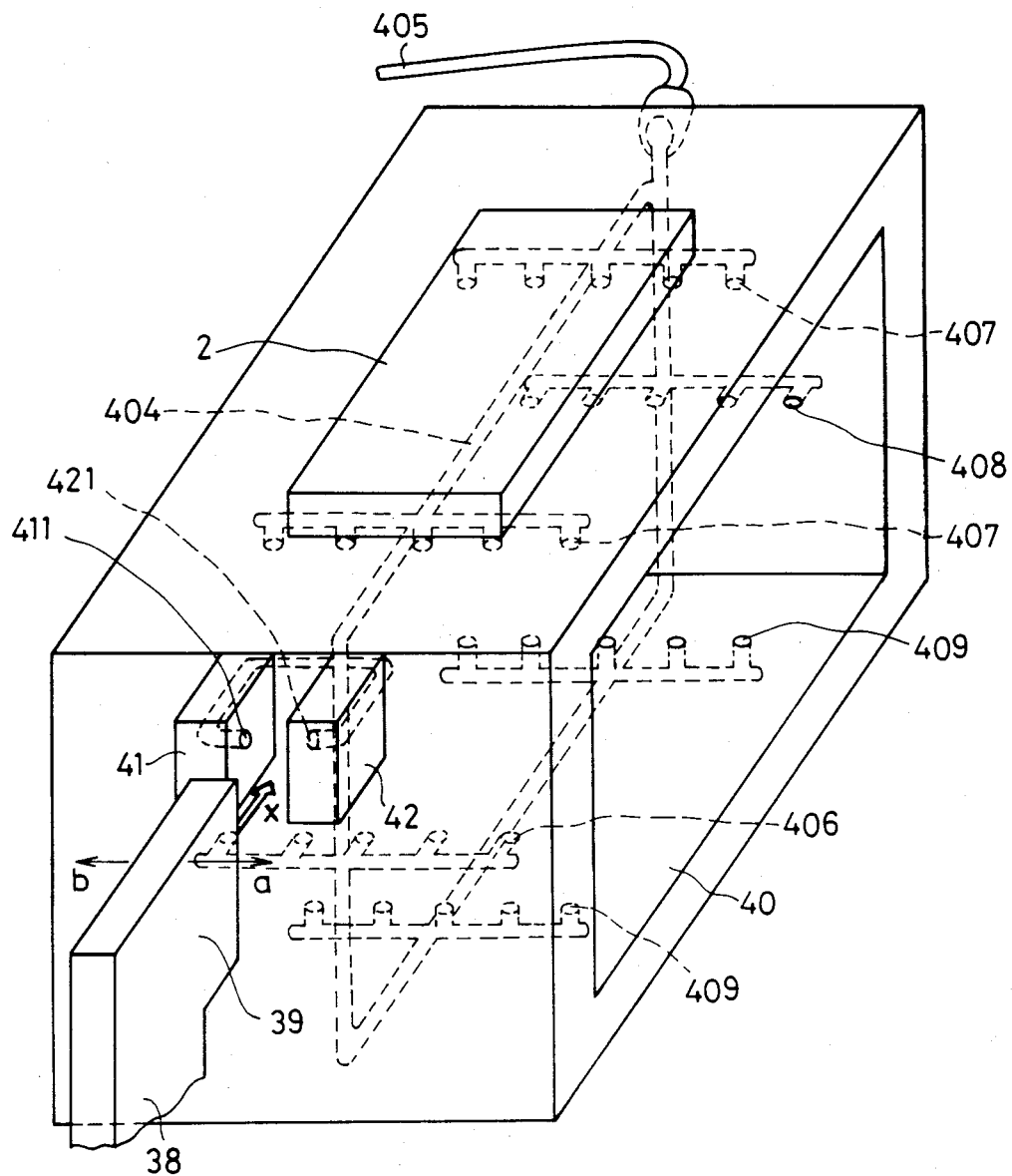
FIG. 5 is an enlarged perspective view of another example of a part of a coupling part between a moving bracket and receiving means therefor.

FIG. 5 shows another example, wherein the elastic coupling between the moving bracket and the holding means is attained by an air bearing. Other parts are substantially the same as those of FIG. 4(a). In this example, as shown in FIG. 5, the holding means 41 and 42 integrally provided on the front side of the sliding table have air holes 411 and 421, respectively in a manner to face the two faces of the end part 39 of the moving bracket 38. Of course the disposition of the end part 39 is that there is an appropriate space or gap between its end edge and the front face of the sliding table 40 so that the moving bracket can move a little without colliding the front face between the holders 41 and 42. The block of the sliding table 40 has air paths 404 formed inside it, which feeds air from the horse 405 to the air discharge holes 406, 407, 408 and 409 on the inside front face, inside upper face, inside rear face and inside lower face, respectively. This construction is similar as that of the example of FIG. 4. And furthermore the air holes 411 and 421 are connected to the air paths 404. The air discharge holes 406, 407, 408 and 409 discharge air in the air gaps between the inside faces of the sliding table 40 and the outside faces of the guide block 6 to constitute the air bearing formed by air films between the sliding table 40 and the guide block 6. By means of air the projecting part 39 of the moving bracket 38 is elastically coupled to the holding means 41 and and 42 by means of a thin air film therebetween forming an air bearing. Therefore, undesirable pitching and yawing motions of the projecting part 39 is absorbed by this air bearing formed between the projecting part 39 and the holding means 41 and 42. And only the motion in the direction of the arrows a and b, that is the motions in the direction normal to the face of the projection 39, is transmitted to the sliding table 40. Furthermore, even if undesirable vibration in axial direction of the moving brcket 39 takes place, this is also absorbed by the air bearing elastic coupling.

What is claimed is:

1. A table slider apparatus comprising:
   a sliding table slidably held in a predetermined direction along a guide block by a sliding bearing on a guide block,
   a driving screw rod which is driven to rotate around its axis by a motor, the axis being in a direction parallel to said predetermined direction,
   a moving bracket having a driven screw hole with a female screw thread and screw-engaged on said driving screw rod by the driven screw hole,
   a guide means which holds said moving bracket in sliding relation in the direction parallel to said predetermined direction, and
   an elastic coupling means for coupling said moving bracket in elastic relation with said sliding table.

2. A table slider apparatus in accordance with claim 1, wherein said elastic coupling means comprises at least a sheet of elastic substance having an abutting face of a plane which is in a direction substantially normal to said predetermined direction, said sheet of elastic substance being inserted in a gap between a face of said moving bracket and a part of said sliding table.

3. A table slider apparatus in accordance with claim 1, wherein said elastic coupling means comprises at least an air bearing having at least an air gap of a predetermined gap width formed between a face of said moving bracket and a face of a part of said sliding table, said faces being in a direction substantially normal to that of said predetermined direction, said air gap being fed with a stream of gas.

* * * * *